United States Patent
Hata et al.

(10) Patent No.: US 10,232,668 B2
(45) Date of Patent: Mar. 19, 2019

(54) PNEUMATIC TIRE WITH CARCASS PLY OVERLAP

(71) Applicant: The Yokohama Rubber Co., LTD., Minato-ku, Tokyo (JP)

(72) Inventors: Hiroshi Hata, Hiratsuka (JP); Yoshiaki Hashimura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 793 days.

(21) Appl. No.: 14/410,720

(22) PCT Filed: May 15, 2013

(86) PCT No.: PCT/JP2013/063582
§ 371 (c)(1),
(2) Date: Dec. 23, 2014

(87) PCT Pub. No.: WO2014/002631
PCT Pub. Date: Jan. 3, 2014

(65) Prior Publication Data
US 2015/0336426 A1    Nov. 26, 2015

(30) Foreign Application Priority Data
Jun. 26, 2012 (JP) .................................. 2012-143444

(51) Int. Cl.
*B60C 9/02* (2006.01)
*B60C 9/18* (2006.01)
(Continued)

(52) U.S. Cl.
CPC ........ *B60C 9/0207* (2013.01); *B29D 30/1614* (2013.01); *B29D 30/30* (2013.01);
(Continued)

(58) Field of Classification Search
CPC ........... B60C 9/02; B60C 9/0207; B60C 9/08; B60C 9/18; B60C 5/14; B60C 19/002;
(Continued)

(56) References Cited

U.S. PATENT DOCUMENTS 5,938,869 A * 8/1999 Kaido ................ B29D 30/0681
152/510
2001/0020509 A1 9/2001 Francois Roesgen et al.
(Continued)

FOREIGN PATENT DOCUMENTS

DE    2 136 169    2/1973
DE    41 11 448    10/1992
(Continued)

OTHER PUBLICATIONS

Jegull (DE 2136169, Jul. 20, 1971, machine translation).*
(Continued)

*Primary Examiner* — Robert C Dye
*Assistant Examiner* — Sedef E Paquette
(74) *Attorney, Agent, or Firm* — Thorpe North & Western (57) ABSTRACT

This pneumatic tire is provided with: a pair of carcass layers arranged so as to extend from the respective left and right beads of the tire across the tread; and a plurality of crossing belts arranged on the outside of the carcass layers in the radial direction of the tire. The pair of carcass layers is arranged so as to overlap each other in the tire width direction. The overlapping width (Wc) of the carcass layers is in the range of 0.5 mm≤Wc≤40 mm.

14 Claims, 11 Drawing Sheets (51) Int. Cl.
- *B60C 19/00* (2006.01)
- *B29D 30/30* (2006.01)
- *B60C 9/08* (2006.01)
- *B60C 5/14* (2006.01)
- *B29D 30/16* (2006.01)
- *B60C 9/04* (2006.01)
- *B29D 30/06* (2006.01)
- *B29D 30/08* (2006.01)

(52) U.S. Cl.
CPC ............ *B29D 30/3014* (2013.01); *B60C 5/14* (2013.01); *B60C 9/08* (2013.01); *B60C 9/18* (2013.01); *B60C 19/002* (2013.01); *B29D 2030/0682* (2013.01); *B29D 2030/086* (2013.01); *B60C 2005/147* (2013.01); *B60C 2009/0408* (2013.01); *Y10T 152/10765* (2015.01)

(58) Field of Classification Search
CPC ...... B60C 2005/147; B60C 2009/0408; B29D 2030/0682; B29D 2030/086; B29D 30/1614; B29D 30/30; B29D 30/3014
USPC .......................... 152/510, 526, 548; 156/123
See application file for complete search history.

(56) References Cited

U.S. PATENT DOCUMENTS

| | | | |
|---|---|---|---|
| 2009/0173431 A1* | 7/2009 | Hashimura | B29D 30/0681 156/123 |
| 2013/0098537 A1 | 4/2013 | Sumitomo Rubber | |

FOREIGN PATENT DOCUMENTS

| | | |
|---|---|---|
| EP | 1 011 991 | 6/2000 |
| FR | 1 443 693 | 6/1966 |
| JP | H06-0211004 | 8/1994 |
| JP | H10-157408 | 6/1998 |
| JP | H10-193914 | 7/1998 |
| JP | 2001-039109 | 2/2001 |
| JP | 2003-225953 | 8/2003 |
| JP | 2008-068743 | 3/2008 |
| JP | 2009-227124 | 10/2009 |
| JP | 2010-269588 | 12/2010 |
| JP | 2010269735 A * | 12/2010 |
| JP | 2013-147166 | 8/2013 |
| WO | WO 1998/38049 | 9/1998 |
| WO | WO 2012/005029 | 1/2012 |

OTHER PUBLICATIONS

Mafune Toshiyuki, JP 2008-068743, Mar. 2008, machine translation.*
Takashi Kitazaki, JP-2010269735, machine translation. (Year: 2010).*
International Search Report for International Application No. PCT/JP2013/063582 dated Jun. 11, 2013, 2 pages, Japan.

* cited by examiner

CHANGE IN TIRE SIZE (TREAD WIDTH)

|  | Conventional Example | Working Example 1 | Comparative Example 1 | Comparative Example 2 | Working Example 2 | Working Example 3 | Working Example 4 |
|---|---|---|---|---|---|---|---|
| Wc [mm] | 0 | 10 | 0.3 | 50 | 3 | 35 | 10 |
| Carcass layer overlap position | — | CENTER REGION | CENTER REGION | CENTER REGION | CENTER REGION | CENTER REGION | SHOULDER REGION |
| Noise performance | 100 | 100 | 100 | 95 | 100 | 100 | 100 |
| Steering stability performance | 100 | 105 | 100 | 105 | 102 | 102 | 103 |
| Durability | 100 | 100 | 100 | 100 | 100 | 100 | 97 |

FIG. 12

PNEUMATIC TIRE WITH CARCASS PLY OVERLAP

TECHNICAL FIELD

The present technology relates to a pneumatic tire and a method for manufacturing a pneumatic tire, and in particular relates to a pneumatic tire that is able to combine both tire noise performance and tire steering stability performance and a method for manufacturing the pneumatic tire.

BACKGROUND ART

A carcass divided structure in which a carcass layer is divided in a center region of a tread has been proposed recently for pneumatic tires. The technology described in Japanese Unexamined Patent Application Publication No. 2001-39109A is a conventional pneumatic tire that is configured in this manner.

SUMMARY

The present technology provides a pneumatic tire that is able to combine both tire noise performance and tire steering stability performance and a method for manufacturing the pneumatic tire.

A pneumatic tire according to the present technology is provided with a pair of carcass layers arranged so as to extend from respective left and right beads of the tire across a tread, and a plurality of crossing belts arranged on the outer side of the pair of carcass layers in the radial direction of the tire, wherein the pair of carcass layers are arranged so as to overlap each other in the tire width direction, and an overlapping width Wc of the carcass layers is in the range of $0.5 \text{ mm} \leq Wc \leq 40 \text{ mm}$.

Further, the method for manufacturing the pneumatic tire according to the present technology is for manufacturing the aforementioned pneumatic tire, wherein the method includes: a side member molding step for molding a side member having a bead member, the carcass layer, a side wall rubber, and a rim cushion rubber; and a green tire molding step for molding a green tire by laminating a left-right pair of the side members, a belt layer, and a tread rubber.

According to the pneumatic tire of the present technology, there is an advantage that both tire steering stability performance and tire noise performance are achieved by optimizing the overlapping width Wc of the left and right carcass layers.

Further, based on the method for manufacturing the pneumatic tire according to the present technology, a step for individually arranging the left and right side members having the carcass layers can be employed in the green tire molding step. As a result, there is an advantage that a green tire assembly step can be simplified.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Further, the multiple modified examples described in the embodiment can be combined as desired within the scope apparent to a person skilled in the art.

[Pneumatic Tire]

Figure 1:
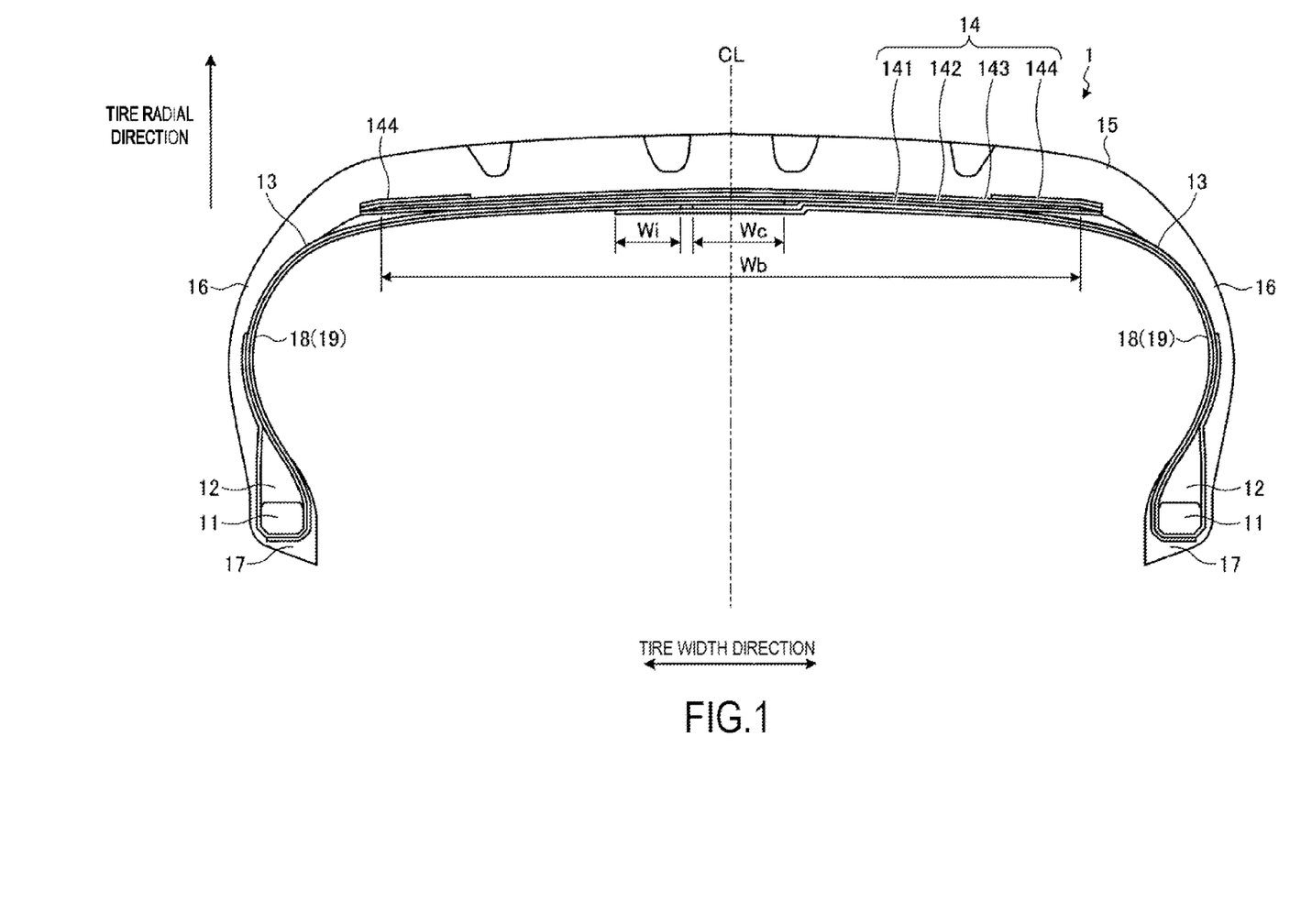
FIG. 1 is a cross-sectional view in a tire meridian direction illustrating a pneumatic tire according to an embodiment of the present technology.

FIG. 1 is a cross-sectional view in a tire meridian direction illustrating a pneumatic tire 1 according to an embodiment of the present technology. FIG. 1 illustrates a radial tire having a carcass divided structure for use on a passenger car as an example of the pneumatic tire. Note that the symbol CL refers to a tire equatorial plane.

The pneumatic tire 1 includes a pair of bead cores 11, 11, a pair of bead fillers 12, 12, a pair of carcass layers 13, 13, a belt layer 14, tread rubber 15, and a pair of side wall rubbers 16, 16 (see FIG. 1).

The pair of bead cores 11, 11 has an annular structure and constitutes cores of left and right beads. The pair of bead fillers 12, 12 is arranged on a periphery of the pair of bead cores 11, 11 in the tire radial direction so as to reinforce the beads.

The pair of carcass layers 13, 13 is arranged so as to extend from the respective left and right bead cores 11, 11 across the tread to constitute the framework of the tire. Further, the pair of carcass layers 13, 13 are arranged so as to overlap each other in the tire width direction. Additionally, an end portion on the inner side in the tire radial direction of each carcass layer 13 is fixed to fold toward the outer side in the tire width direction so as to wrap around the bead core 11 and the bead filler 12. Additionally, the carcass layer 13 is configured by a plurality of carcass cords formed from steel or organic fibers (for example, nylon, polyester, rayon, or the like), covered by coating rubber, and subjected to a rolling process.

The belt layer 14 is formed by laminating a pair of crossing belts 141, 142, a belt cover 143, and a pair of edge covers 144, 144, and is arranged so as to wind around the periphery of the carcass layer 13. The pair of crossing belts 141 and 142 is constituted by a plurality of belt cords formed from steel or organic fibers, covered by coating rubber, and subjected to a rolling process, having a belt angle of not less than 10° and not more than 30° (when expressed as an absolute value). Further, the pair of crossing belts 141, 142 has belt angles (inclination angles in the fiber directions of the belt cords with respect to the tire circumferential direction) denoted with mutually different symbols and the belts are laminated so as to intersect each other in the belt cord fiber direction (crossply structure). The belt cover 143 is configured by a plurality of belt cords formed from steel or organic fibers, covered by coating rubber, and subjected to a rolling process, having a belt angle, as an absolute value, of not less than 10° and not more than 45°. Further, the belt cover 143 is arranged so as to be laminated on the outer side in the tire radial direction of the crossing belts 141, 142. The pair of edge covers 144, 144 is arranged on the outer sides in the tire radial direction and on the left and right edge portions of the belt cover 143.

The tread rubber 15 is arranged on the periphery in the tire radial direction of the carcass layers 13, 13 and the belt layer 14, so as to form the tread of the tire. The pair of side wall rubbers 16, 16 is arranged on each outer side of the carcass layer 13 in the tire width direction, so as to form left and right side wall portions of the tire.

Note that the pneumatic tire 1 in the configuration depicted in FIG. 1 is provided with the pair of bead cores 11, 11, the pair of bead fillers 12, 12, and the pair of side wall rubbers 16, 16 as described above. However, without being limited as such, the pneumatic tire 1 may also be provided with a plurality of pairs of bead cores 11, 11, a plurality of pairs of bead fillers 12, 12, or a plurality of pairs of side wall rubbers 16, 16 (not illustrated). For example, two bead fillers 12 may be provided on both the left and right sides of the tire.

Further, the left and right bead fillers 12, 12 may be omitted from the configuration depicted in FIG. 1 (not illustrated). Therefore, a configuration without bead filler 12 may be assumed. The configuration having both the bead core 11 and the bead filler 12 (see FIG. 1) and the configuration having only the bead core 11 and omitting the bead filler 12 (not illustrated) are both referred to as a bead member in the embodiment.

Further, the carcass layer 13 has a single layer structure in the configuration depicted in FIG. 1. However, without being limited as such, the carcass layer 13 may have a multi-layer structure formed by laminating a plurality of carcass plies (not illustrated).

[Inner Liner]

Further, the pneumatic tire 1 is provided with a pair of inner liners 18, 18 (see FIG. 1). The inner liners 18, 18 are rubber members that cover the left and right carcass layers 13, 13 and the belt layer 14 from the inner surface of the tire, and are arranged so as to overlap each other in the tire width direction. The inner liner 18 suppresses oxidation caused by exposure of the carcass layer 13 and the belt layer 14, and also suppresses the leakage from an inflated tire.

For example, the left and right inner liners 18, 18 in the configuration in FIG. 1 extend from the inner side in the tire radial direction of the left and right bead cores 11, 11 along the inner circumferential surface of the left and right carcass layers 13, 13 to the outer side in the tire radial direction and are bonded so as to overlap each other in the center region of the tread. Further, each inner liner 18 is a band-like rubber sheet which extends around the tire along the carcass layer 13, and the both ends thereof in the circumferential direction are bonded so as to overlap each other. As a result, a toroidal rubber sheet is formed and the inner circumferential surface of the carcass layer 13 (and the inner circumferential surface of the belt layer 14) is completely covered.

[Arrangement Structure of Carcass Layer and Inner Liner]

Figure 2:
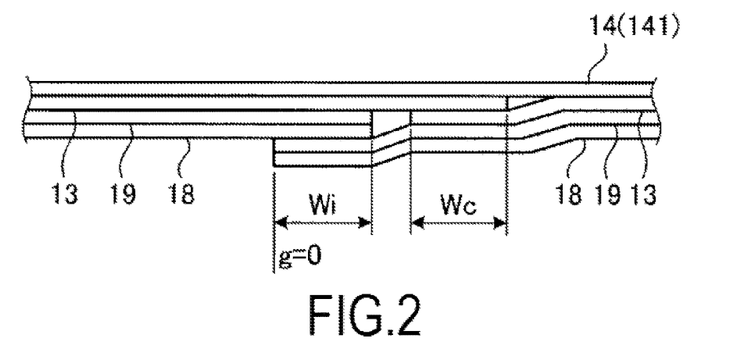
FIG. 2 is an explanatory view illustrating a main portion of the pneumatic tire depicted in FIG. 1.

FIG. 2 is an explanatory view illustrating a main portion of the pneumatic tire depicted in FIG. 1. FIG. 2 schematically illustrates the positional relationships of end portions on the inner side in the tire width direction of the left and right carcass layers 13, 13, the belt layer 14 (the crossing belt 141 on the inner side in the tire radial direction), the left and right inner liners 18, 18, and left and right tie rubbers 19, 19 in the center region of the tread.

As illustrated in FIG. 2, the inner liner 18 is adhered to the carcass layer 13 and the belt layer 14 via the adhesive tie rubber 19. As a result, the adhesive state of the inner liner 18 is properly assured. Note that the description of the tie rubber 19 is omitted in FIG. 1 since the inner liner 18 and the tie rubber 19 are integrated.

For example, the inner liner 18 and the tie rubber 19 are previously laminated to become integrated in the configurations in FIG. 1 and FIG. 2. Further, the end portions (end surfaces) of the inner liner 18 and the tie rubber 19 are arranged so as to be aligned (g=0). As a result, a tire member assembly step is simplified.

Moreover, the left and right carcass layers 13, 13 in the configurations in FIG. 1 and FIG. 2 extend to the outer side in the tire radial direction from the left and right bead cores 11, 11 and are arranged so as to overlap each other in the center region of the tread. Furthermore, the left and right inner liners 18 and the tie rubbers 19 extend from the inner side in the tire radial direction of the left and right bead cores 11, 11 along the inner circumferential surface of the left and right carcass layers 13, 13 to the outer side in the tire radial direction and are arranged so as to overlap each other in the center region of the tread. As a result, the left and right inner liners 18 are arranged so as to completely cover the inner circumferential surface of the carcass layers 13 (and the inner circumferential surface of the belt layer 14).

Moreover, the inner liners 18 and the tie rubbers 19 at this time are arranged so as to cover the overlapping portion of the end portions of the left and right carcass layers 13, 13 from a side with the tire inner circumferential surface. Furthermore, the overlapping position of the end portions of the left and right inner liners 18, 18 (and the tie rubbers 19, 19) and the overlapping position of the end portions of the left and right carcass layers 13, 13 are arranged so as to be shifted away from each other in the tire width direction. As a result, the tire inner circumferential surface is made flatter than in a configuration in which the overlapping position of the inner liners and the overlapping position of the carcass layers are arranged on top of each other (not illustrated).

Further, an overlapping width Wc of the left and right carcass layers 13, 13 in the pneumatic tire 1 is preferably in the range of $0.5 \text{ mm} \leq Wc \leq 40 \text{ mm}$, or more preferably in the range of $3 \text{ mm} \leq Wc \leq 20 \text{ mm}$ (see FIG. 1 and FIG. 2). Furthermore, the overlapping width Wc with respect to a belt width Wb of the narrow crossing belt 142 is preferably in the range of $0.002 \leq Wc/Wb \leq 0.3$. As a result, the overlapping width Wc of the left and right carcass layers 13, 13 is optimized. Note that, in a configuration in which the carcass layer 13 has a plurality of carcass plies laminated to form a multi-layer structure (not illustrated), the overlapping width Wc of the left and right carcass layers 13, 13 is measured on the basis of end portions located furthest to the inner side in the tire width direction of the plurality of carcass plies.

Further, an overlapping width Wi of the left and right inner liners 18, 18 is in the range of $0.5 \text{ mm} \leq Wi \leq 35 \text{ mm}$ (see FIG. 2). As a result, the overlapping width Wi (bonding margin) of the left and right inner liners 18, 18 is optimized.

Further, the overlapping position of the pair of carcass layers 13, 13 is in the region of $\pm 0.35 \times Wb$ centered on the tire equatorial plane CL on the basis of the belt width Wb of the crossing belt 142 which is the second widest among the plurality of crossing belts 141, 142 (see FIG. 1). That is, the overlapping position of the pair of carcass layers 13, 13 is arranged in the center region of the tread.

For example, the pair of crossing belts 141, 142 in the configuration in FIG. 1 is arranged so as to exhibit left-right symmetry with respect to the tire equatorial plane CL. Further, the overlapping position of the left and right carcass layers 13, 13 is arranged so as to straddle the tire equatorial plane CL, thereby being arranged in the center portion of the second widest crossing belt 142. Furthermore, the overlapping position of the left and right carcass layers 13, 13 and the overlapping position of the left and right inner liners 18, 18 are arranged so as to be shifted away from each other in the tire width direction.

Figure 8:
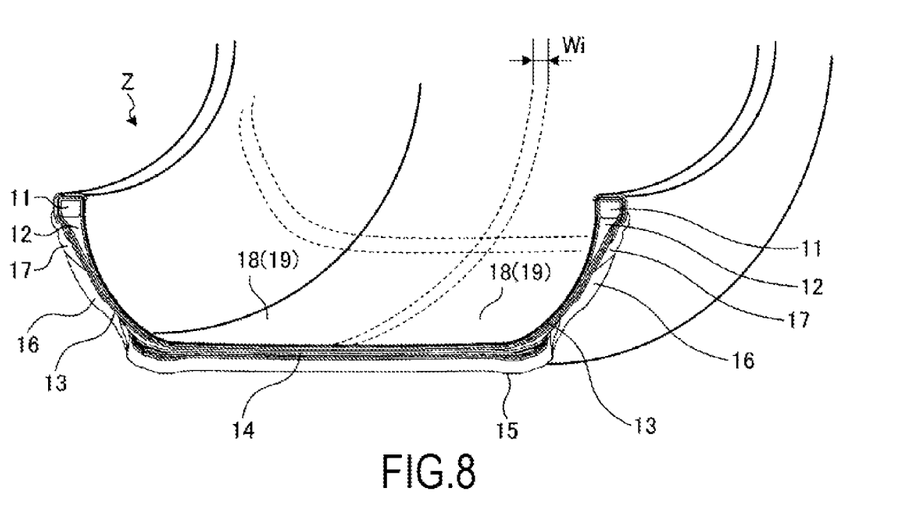
FIG. 8 is an explanatory view illustrating the method of manufacturing the pneumatic tire depicted in FIG. 1.

Further, as illustrated in FIG. 8 below, each inner liner 18 has an annular structure in which both end portions thereof overlap each other in the tire circumferential direction in the pneumatic tire 1. The overlapping width in the tire circumferential direction of each inner liner 18 at this time is in the range of 0 mm or more to 3 mm or less. As a result, the inner circumferential surface of the carcass layer 13 and the inner circumferential surface of the belt layer 14 are completely and properly covered.

[Method for Manufacturing Pneumatic Tire]

Figure 3A:
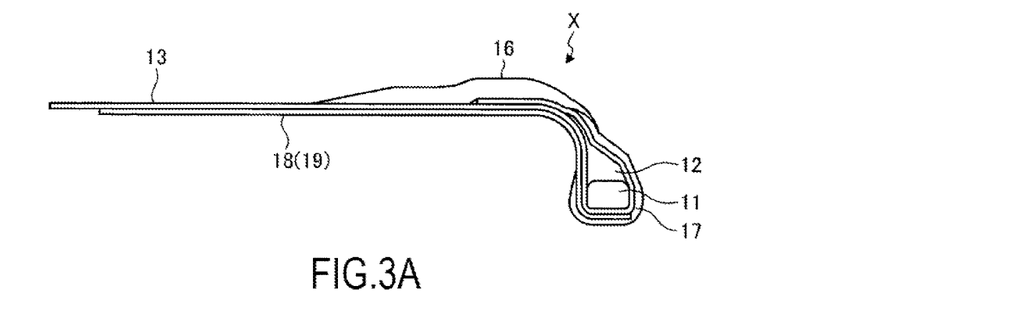
FIGS. 3A and 3B are explanatory views illustrating a method of manufacturing the pneumatic tire depicted in FIG. 1.

FIGS. 3A to 8 are explanatory views illustrating a method for manufacturing the pneumatic tire depicted in FIG. 1. Among these figures, FIGS. 3A and 3B illustrate a molded left-right pair of side members X, X. The description of the tie rubber 19 is omitted in FIGS. 3A and 3B since the inner liner 18 and the tie rubber 19 are integrated. Further, FIGS. 4 to 8 illustrate a green tire Z molding step.

The pneumatic tire 1 is manufactured in the following manner.

Figure 3B:
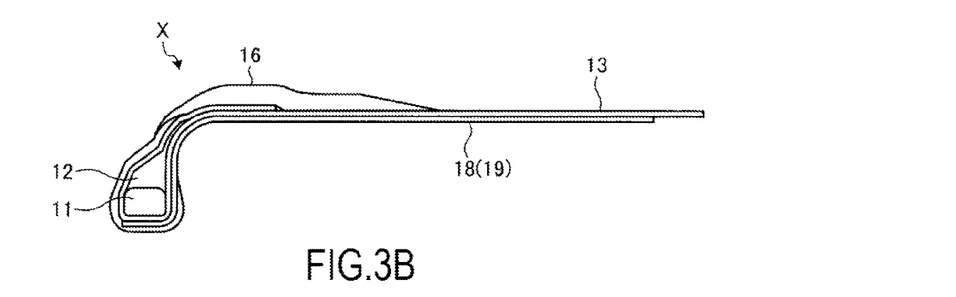

First, the left and right side members X, X are each molded (see FIGS. 3A and 3B). One side member X is constituted of one bead core 11, one bead filler 12, one carcass layer 13, one side wall rubber 16, one rim cushion rubber 17, and one inner liner 18 (and tie rubber 19), and has a uniform cross-section and an annular structure. The side member X is assembled, for example, by setting the members on a side member molding drum (not illustrated). Further, the left-right pair of side members X, X is molded using the same steps. An optional step may be employed as a step for molding the side member X.

Figure 4:
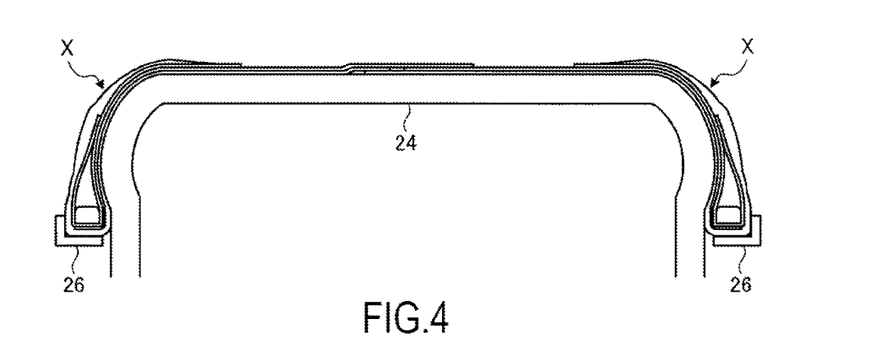
FIG. 4 is an explanatory view illustrating the method of manufacturing the pneumatic tire depicted in FIG. 1.
Figure 5A:
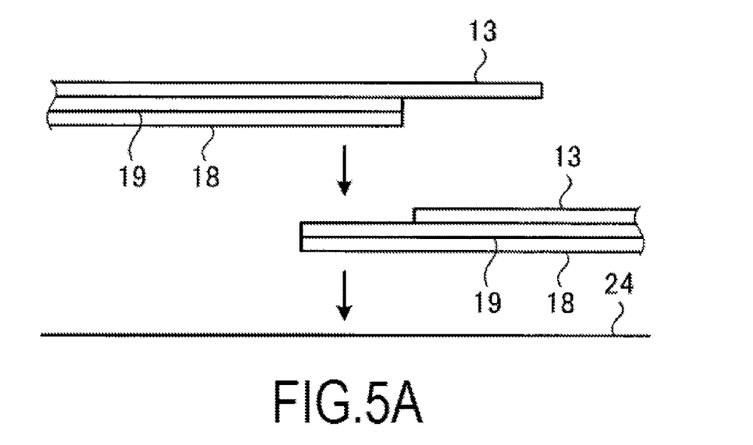
FIGS. 5A and 5B are explanatory views illustrating the method of manufacturing the pneumatic tire depicted in FIG. 1.
Figure 5B:
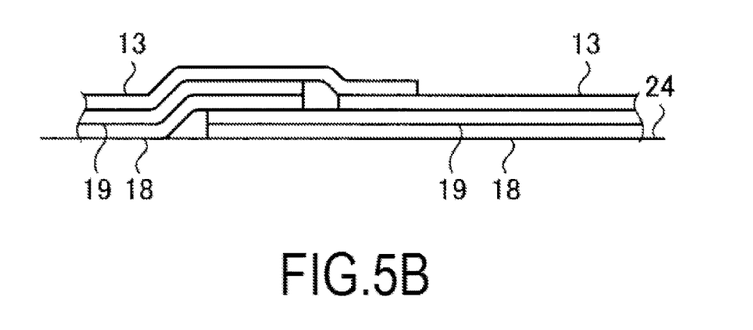

Next, as illustrated in FIG. 4, the left and right side members X, X are individually arranged on a molding drum 24. At this time, each side member X having the annular structure is arranged on the molding drum 24 from the side of the molding drum 24 and clamped at the bead with a clamping device 26. Further, as illustrated in FIGS. 5A and 5B, the end portions of the left and right carcass layers 13, 13 are arranged so as to overlap each other, and the end portions of the left and right inner liners 18 (and the tie rubbers 19) are arranged so as to overlap each other. Furthermore, as illustrated in FIGS. 3A and 3B, the left and right inner liners 18 (and the tie rubbers 19) have different widths, whereby the left and right inner liners 18 are arranged so as to properly overlap each other.

Further, in the above steps, the work for mounting the bead cores 11, the bead fillers 12, the carcass layers 13, the side wall rubbers 16, the inner liners 18, and the tie rubbers 19 on the molding drum 24 can be simplified by using the previously molded left and right side members X, X (see FIGS. 3A and 3B).

However, without being limited as such, the bead cores 11, the bead fillers 12, the carcass layers 13, the side wall rubbers 16, the rim cushion rubbers 17, the inner liners 18, and the tie rubbers 19 may be mounted sequentially on the molding drum 24 without the left and right side members X, X being previously molded (not illustrated). Therefore, the left and right side members X, X may be assembled on the molding drum 24.

Figure 6:
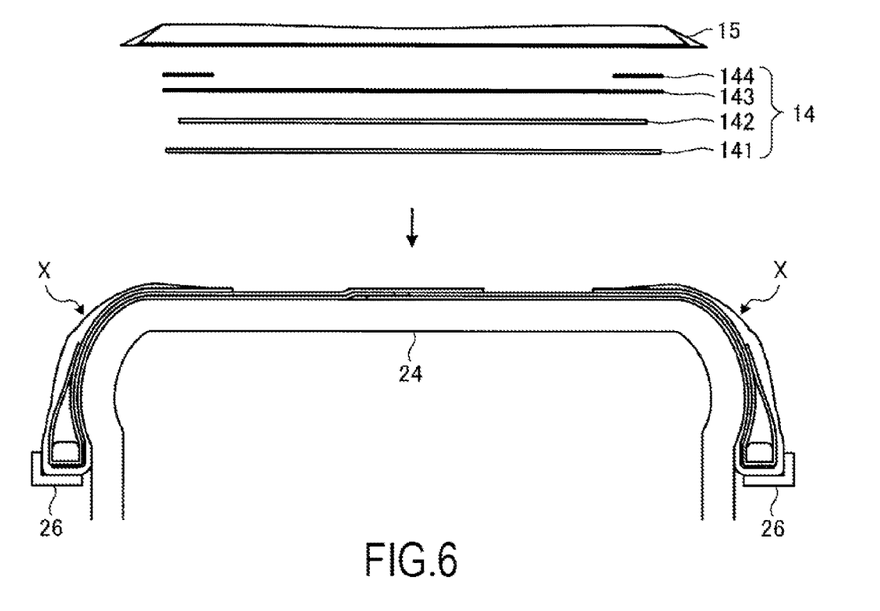
FIG. 6 is an explanatory view illustrating the method of manufacturing the pneumatic tire depicted in FIG. 1.
Figure 7:
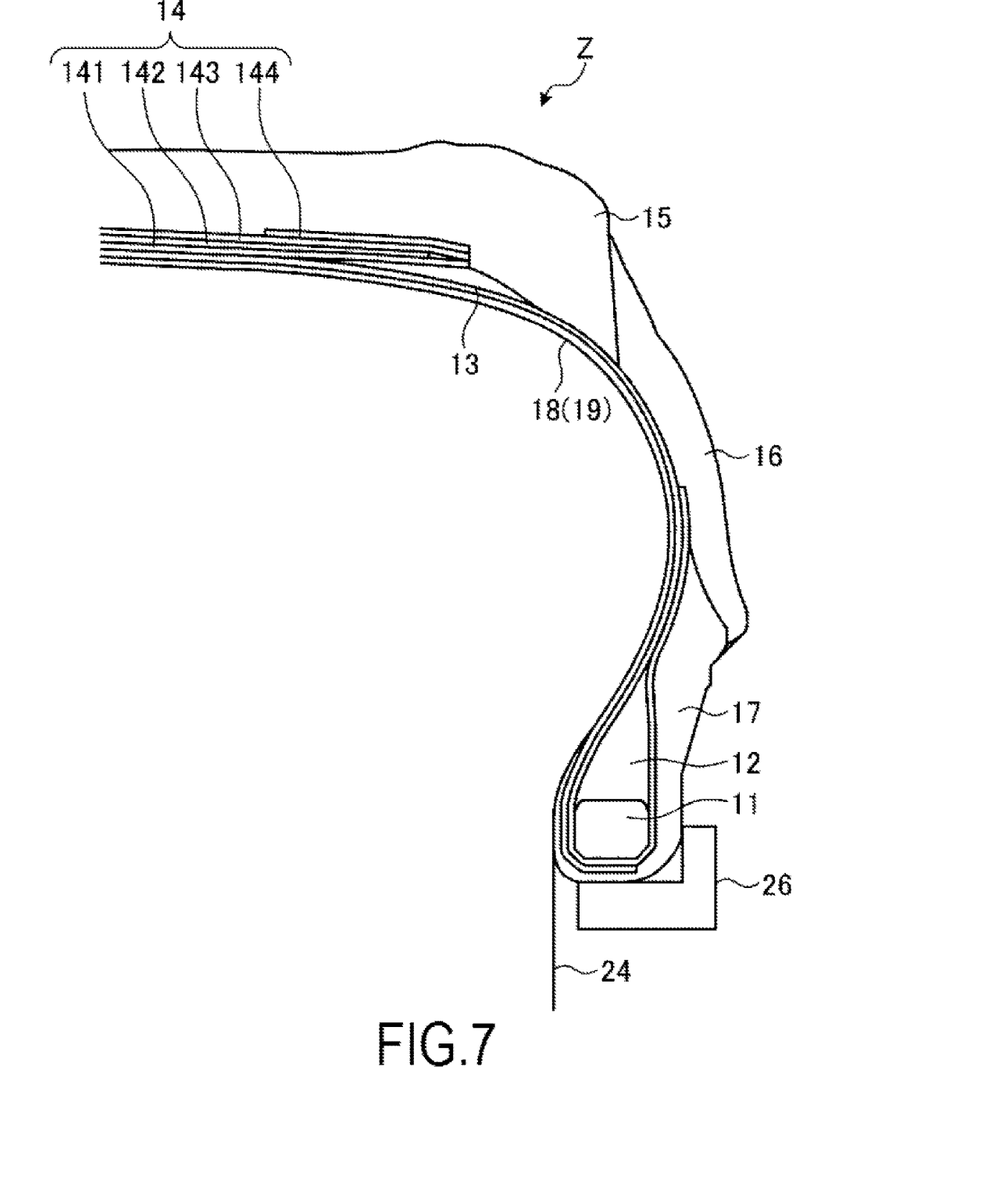
FIG. 7 is an explanatory view illustrating the method of manufacturing the pneumatic tire depicted in FIG. 1.

Next, as illustrated in FIG. 6, each of the members constituting the belt layer 14 (the pair of crossing belts 141, 142, the belt cover 143, and the pair of edge covers 144, 144) and the tread rubber 15 are arranged, and the green tire Z (see FIG. 7) is molded. Further, as illustrated in FIG. 8, the both end portions in the circumferential direction of the inner liner 18 are arranged so as to overlap each other in the tire circumferential direction in the green tire Z.

Next, the green tire Z is subjected to vulcanization molding. Specifically, the green tire Z is placed in a tire vulcanization mold (not illustrated) while the green tire Z is mounted on the molding drum 24. Then, the tire vulcanization mold is heated and a tire molding die in the tire vulcanization mold is pressurized and sealed, whereby the green tire Z is pressed between the tire molding die in the tire vulcanization mold and the molding drum 24. Additionally, the green tire Z is heated, whereby rubber molecules and sulfur molecules of the tread are bonded, and vulcanization is performed. At this time, a shape of the tire molding die is transferred to a tread surface of the green tire Z, and a tread pattern of the tire is molded. Then, the molded tire is pulled out from the tire vulcanization mold.

Figure 9A:
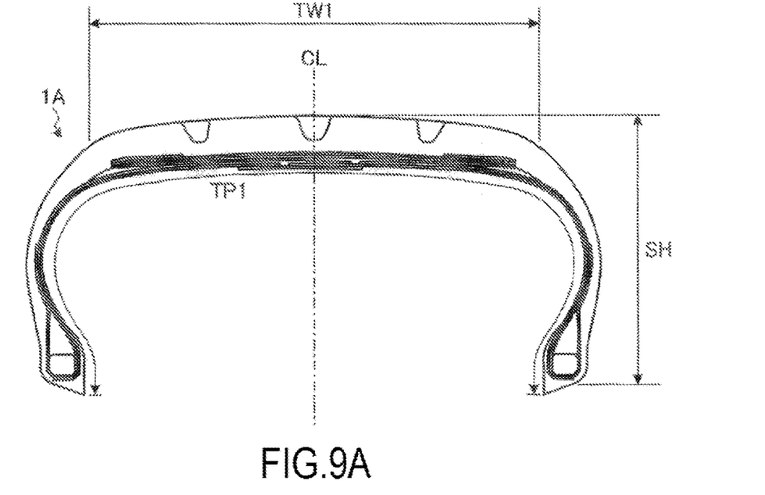
FIGS. 9A and 9B are explanatory views illustrating of an effect of the pneumatic tire depicted in FIG. 1.
Figure 9B:
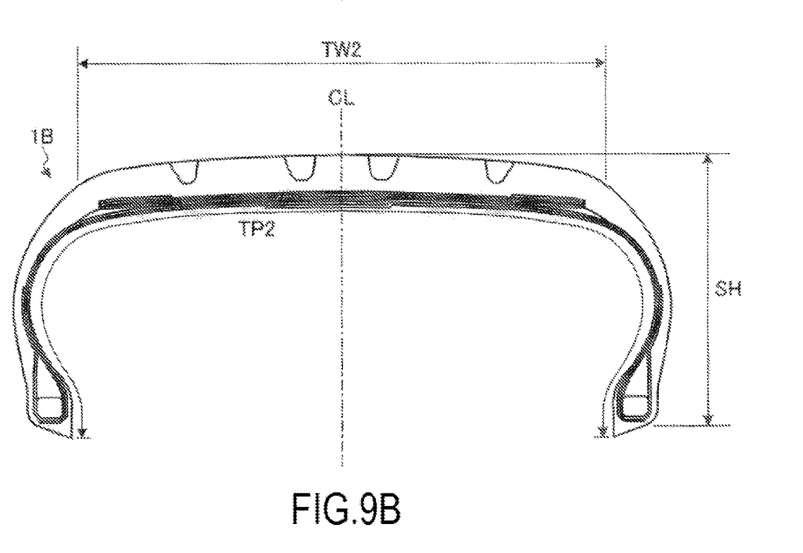
Figure 10:
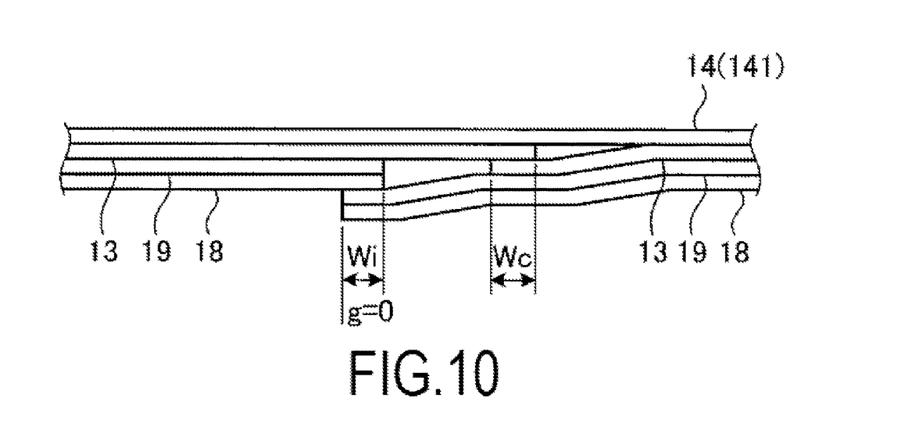
FIG. 10 is an explanatory view illustrating an effect of the pneumatic tire depicted in FIG. 1.

FIGS. 9A, 9B, and 10 are explanatory views illustrating an effect of the pneumatic tire depicted in FIG. 1. Among these figures, FIGS. 9A and 9B illustrate two types of pneumatic tires 1A, 1B, respectively. The pneumatic tires 1A, 1B have the same cross-section height SH but having different tread widths TW1, TW2 and different tire periphery lengths TP1, TP2. Further, FIG. 10 schematically illustrates the positional relationships of end portions on the inner side in the tire width direction of the left and right carcass layers 13, 13, the belt layer 14 (the crossing belt 141 on the inner side in the tire radial direction), the left and right inner liners 18, 18, and the left and right tie rubbers 19, 19 in the center region of the tread.

As described above, in the step for manufacturing the pneumatic tire 1, the left and right side members X, X (see FIGS. 3A and 3B) are previously assembled and are then arranged on the molding drum 24, and the green tire Z is molded (see FIGS. 4 to 7). At this time, since the left and right side members X, X have the respective carcass layers 13, the carcass layers 13 can be easily arranged on the molding drum 24 by arranging the left and right side members X, X on the molding drum 24 from the side of the molding drum 24. For example, in a configuration (not illustrated) in which a carcass layer having a single structure is arranged on the molding drum while extending between the left and right bead cores and taking a toroidal shape, the step for mounting the carcass layer onto the molding drum is not simple and is not desirable since the bead and the tread have different circumferential lengths.

Additionally, because the left and right side members X, X in the above configuration have the respective carcass layers 13 and the respective inner liners 18, the carcass layers 13 and the inner liners 18 can be arranged on the molding drum 24 easily by arranging the left and right side members X, X on the molding drum 24.

Further, since the carcass layers 13 and the inner liners 18 have a structure divided into left and right portions of the tire (see FIG. 1) in the above configuration, a step can be employed in which the left and right side members X, X having the carcass layers 13 and the inner liners 18 are each formed and are arranged on the molding drum 24 in the green tire Z assembly step (see FIGS. 3A, 3B, and 4). As a result, the green tire Z assembly step can be simplified since the carcass layers 13 and the inner liners 18 can be arranged easily on the molding drum 24.

Further, the above configuration is especially advantageous, for example, in the step for manufacturing the two types of pneumatic tires 1A, 1B having the same cross-section height SH but having different tread widths TW1, TW2 as illustrated in FIGS. 9A and 9B. That is, the left and right side members X, X can be molded separately in a state of being divided from each other (see FIGS. 3A and 3B) in the above configuration. As a result, the side members X, X can be commonly used in the two types of pneumatic tires 1A, 1B having the same cross-section height SH but having different tire periphery lengths TP1, TP2. As a result, inventory of in-process products can be reduced.

Note that the tread widths TW1, TW2 can be easily adjusted by adjusting the overlapping width Wc of the left and right carcass layers 13, 13 and the overlapping width Wi of the left and right inner liners 18, 18 as can be understood by comparing FIG. 2 and FIG. 10.

Modified Examples

Figure 11A:
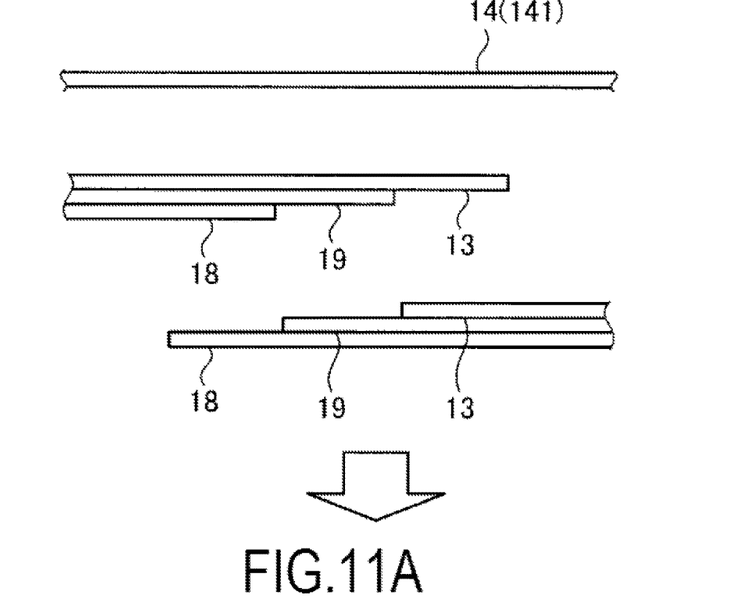
FIGS. 11A and 11B are explanatory views illustrating a modified example of the pneumatic tire depicted in FIG. 1.
Figure 11B:
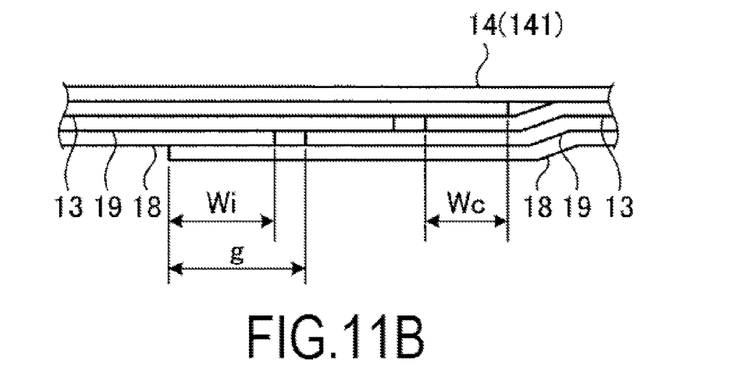

FIGS. 11A and 11B are explanatory views illustrating a modified example of the pneumatic tire depicted in FIG. 1. FIGS. 11A and 11B schematically illustrate steps for assembling the end portions on the inner side in the tire width direction of the left and right carcass layers 13, 13, the belt layer 14 (the crossing belt 141 on the inner side in the tire radial direction), the left and right inner liners 18, 18, and the left and right tie rubbers 19, 19 in the center region of the tread.

In the configuration in FIG. 2, as illustrated in FIGS. 3A, 3B, 5A, and 5B, the end portion of the carcass layer 13 and the end portions of the inner liner 18 and the tie rubber 19 in each side member X are arranged so as to be shifted away from each other. Further, the end portions of the inner liner 18 and the tie rubber 19 are arranged so as to be aligned with each other (g=0). Then, the overlapping position of the left and right carcass layers 13, 13 and the overlapping position of the left and right inner liners 18, 18 (and the tie rubbers 19, 19) are arranged so that the positions are shifted away from each other so as not to be on top of each other.

Conversely, the end portion of the carcass layer 13 and the end portions of the inner liner 18 and the tie rubber 19 in each side member X in the configuration in FIGS. 11A and 11B are arranged so as to be shifted away from each other (a gap g is created). Then, the overlapping position of the left and right carcass layers 13, 13, the overlapping position of the left and right inner liners 18, 18, and the overlapping position of the left and right tie rubbers 19, 19 are arranged so that the positions are shifted away from each other so as not to be on top of each other. Accordingly, the tire inner circumferential surface is flattened further by arranging the overlapping position of the inner liners 18, 18 and the overlapping position of the tie rubbers 19, 19 so that the positions are shifted away from each other in the configuration in FIG. 2.

Effect

As described above, this pneumatic tire 1 is provided with the pair of carcass layers 13, 13 arranged so as to extend from the respective left and right beads of the tire across the tread, and the plurality of crossing belts 141, 142 arranged on the outer side of the carcass layers 13, 13 in the tire radial direction (see FIG. 1). Further, the pair of carcass layers 13, 13 are arranged so as to overlap each other in the tire width direction. Furthermore, the overlapping width Wc of the carcass layers 13, 13 is in the range of $0.5 \text{ mm} \leq Wc \leq 40 \text{ mm}$.

Because the left-right pair of carcass layers 13, 13 are arranged so as to overlap each other in the tire width direction, such a configuration is advantageous in that the step for mounting the carcass layers 13 on the molding drum 24 can be simplified in comparison to a configuration (not illustrated) in which a carcass layer having a single structure is arranged on the molding drum while extending between the left and right bead cores and taking a toroidal shape. Further, there is an advantage that both tire steering stability performance and tire noise performance are achieved by optimizing the overlapping width Wc of the left and right carcass layers 13, 13. That is, tire steering stability performance is improved due to the overlapping width Wc being equal to or greater than 0.5 mm, and tire noise performance is improved due to the overlapping width Wc being equal to or less than 40 mm.

Further, the pneumatic tire 1 is provided with the pair of inner liners 18, 18 that covers the pair of carcass layers 13, 13 from the side with the tire inner circumferential surface (see FIG. 1). Furthermore, the pair of inner liners 18, 18 are arranged so as to overlap each other in the tire width direction. Since the carcass layers 13 and the inner liners 18 have a structure divided into left and right portions of the tire in such a configuration, a step can be employed in which the left and right side members X, X having the carcass layers 13 and the inner liners 18 are each molded (see FIGS. 3A and 3B) and are arranged on the molding drum 24 (see FIGS. 4, 5A, and 5B) in the green tire Z molding step. As a result, there is an advantage that the green tire Z assembly step can be simplified since the carcass layers 13 and the inner liners 18 can be arranged easily on the molding drum 24.

Further, the overlapping width Wi of the pair of inner liners 18, 18 is in the range of $0.5 \text{ mm} \leq Wi \leq 35 \text{ mm}$ in the pneumatic tire 1 (see FIG. 1). As a result, there is an advantage that the overlapping width Wi of the left and right inner liners 18, 18 is optimized. That is, an opening in the overlapping portion of the inner liners 18, 18 can be properly prevented during tire vulcanization by leaving a bonding margin in which Wi is equal to or greater than 0.5 mm. Furthermore, by making the overlapping width Wi equal to or less than 35 mm, the rubber volume in the overlapping portion of the inner liners 18 can be reduced, and damage due to non-compression characteristics of the rubber on the inner ring or the die during vulcanization molding can be prevented.

Further, the overlapping position of the pair of carcass layers 13, 13 in the pneumatic tire 1 is in the region of $\pm 0.35 \times Wb$ centered on the tire equatorial plane CL on the basis of the belt width Wb of the second widest crossing belt 142 among the plurality of crossing belts 141, 142 (see FIG. 1). In such a configuration, the occurrence of splice failure can be suppressed in comparison to a configuration in which the overlapping position of the carcass layers 13, 13 is arranged in the region of the end portions of the crossing belt 142. Thus, such a configuration is advantageous that the tire durability is improved.

Further, the end portions of the carcass layers 13 and the end portions of the inner liners 18 are arranged so as to be shifted away from each other in the pneumatic tire 1 (see FIGS. 3A and 3B). Such a configuration is advantageous in that the tire inner circumferential surface can be made flatter than in a configuration (not illustrated) in which the end portions of the carcass layers and the end portions of the inner liners are aligned with each other.

Further, the inner liners 18 in the pneumatic tire 1 are arranged so as to cover the overlapping portion of the end portions of the left and right carcass layers 13, 13 from the side with the tire inner circumferential surface (see FIG. 2). Furthermore, the overlapping position of the end portions of the left and right inner liners 18, 18 and the overlapping position of the end portions of the left and right carcass layers 13, 13 are arranged so as to be shifted away from each other in the tire width direction. As a result, there is an advantage in that the tire inner circumferential surface can be made flatter than in a configuration (not illustrated) in which the overlapping position of the inner liners and the overlapping position of the carcass layers are arranged on top of each other.

Further, the inner liners 18 in the pneumatic tire 1 are adhered to the carcass layers 13 via the adhesive tie rubbers 19 (see FIG. 2). As a result, there is an advantage in that the adhesive state of the inner liners 18 is properly assured.

Further, the end portions of the inner liners 18 and the end portions of the tie rubbers 19 are arranged so as to be aligned with each other in the pneumatic tire 1. Such a configuration is advantageous in that the tire member assembly step can be simplified since integrated members in which the inner liners 18 and the tie rubbers 19 are previously laminated can be used in the green tire molding step.

Further, the end portions of the inner liners 18 and the end portions of the tie rubbers 19 are arranged so as to be shifted away from each other in the pneumatic tire 1 (see FIGS. 11A and 11B). Such a configuration is advantageous in that the tire inner circumferential surface can be made flatter than in a configuration (see FIG. 2) in which the end portions of the inner liners 18 and the end portions of the tie rubbers 19 are aligned with each other.

Further, the method for manufacturing the pneumatic tire 1 is provided with: a side member molding step (see FIGS. 3A and 3B) for molding the side member X having the bead member (a member including at least the bead core 11), the carcass layer 13, the side wall rubber 16, and the rim cushion rubber 17; and a green tire molding step (see FIGS. 6 and 7) for molding the green tire Z by laminating the left-right pair of side members X, X, the belt layer 14, and the tread rubber 15. Note that the green tire molding step may involve (1) arranging the left-right pair of side members X, X, the belt layer 14, and the tread rubber 15 on the molding drum 24 which can be expanded and contracted in the radial direction or (2) arranging the same on a rigid inner ring, to mold the green tire Z.

Such a configuration may employ a step of individually arranging the left and right side members X, X having the carcass layers 13 on the molding drum 24 in the green tire Z molding step. As a result, there is an advantage that the green tire Z assembly step can be simplified.

EXAMPLES

Figure 12:
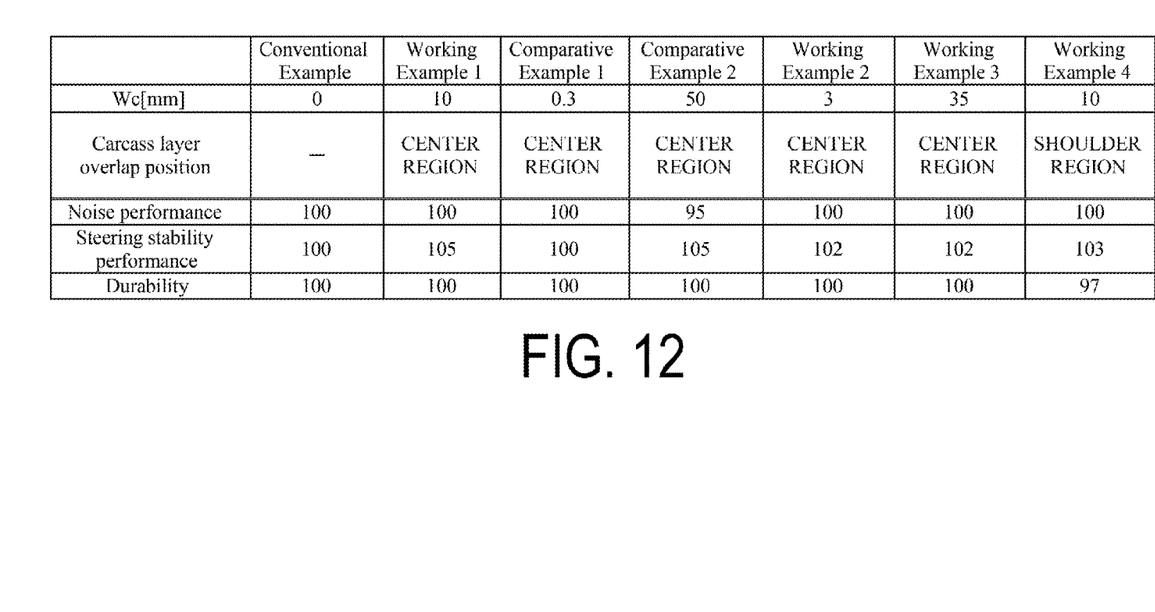
FIG. 12 is a table showing results of performance testing of pneumatic tires according to embodiments of the present technology.

FIG. 12 is a table showing results of performance testing of pneumatic tires according to embodiments of the present technology.

Evaluations of (1) noise performance, (2) steering stability performance, and (3) durability of a plurality of mutually different pneumatic tires were conducted for the performance tests (see FIG. 12). In the performance tests, pneumatic tires having a tire size of 235/40R18 were assembled on a regular rim stipulated by JATMA. Further, the pneumatic tires were mounted on a front-engine, front-drive (FF) passenger vehicle with an engine displacement of 2.0 [L], and the pneumatic tires were inflated to an inner pressure of 230 [kPa].

(1) The test vehicle was driven at 50 [km/h] on a test course having a rough road surface, and vehicle interior noise was measured for the evaluations concerning noise performance (road noise). Then, index evaluation with the Conventional Example tire as a reference (100) was conducted based on the measurement results. A larger numerical value indicates a correspondingly lower road noise and is thus desirable in the evaluations.

(2) The test vehicle was driven on a prescribed test course and a panel of five people performed an index evaluation on a feeling of steering stability performance for the evaluations concerning steering stability performance. Then, the average score of three index evaluations excluding the highest and the lowest evaluations among the five index evaluations was calculated and used. A larger numerical value indicates a correspondingly superior steering stability performance and is thus desirable in the evaluations.

(3) The test tires were mounted onto a drum test machine for durability having an evaluation drum diameter of 1707 mm, and the test tires were inflated to an inner pressure of 180 [k/Pa]. Then, the test tires were driven at 81 [km/h] at an ambient temperature of 38±3 [C.°] for 4 hours at 85%, for 6 hours at 90%, for 24 hours at 100%, for 4 hours at 115%, for 4 hours at 130%, for 4 hours at 145%, and for 4 hours at 160% of the JATMA regulation maximum load, and then the occurrence of damage on the outer side and on the inner side of the tires was observed, and an index evaluation was conducted with the Conventional Example as a reference (100). A numerical value of 97 or more indicates that the required durability is assured in the evaluations.

The pneumatic tires 1 of the Working Examples 1 to 4 had the structure illustrated in FIGS. 1 and 2. Further, the overlapping position of the carcass layers 13 in the Working Example 4 is located at the position 0.40×Wb of the belt width Wb of the crossing belt 142 away from the tire equatorial plane CL (position further to the outer side than 0.35×Wb).

The Conventional Example pneumatic tire had a structure in which the end portions of the left and right carcass layers 13, 13 were arranged so as to abut against each other, and had a single structure in which the inner liners 18 (and the tie rubbers 19) extend between the left and right beads (not illustrated).

As can be seen from the test results, (1) noise performance and (2) steering stability performance were both achieved in the pneumatic tires 1 of the Working Examples 1 to 4.

What is claimed is:
1. A pneumatic tire comprising:
    left and right carcass layers forming a pair of carcass layers arranged so as to extend from respective left and right beads of the tire into a tread region;
    a plurality of crossing belts arranged on an outside of the pair of carcass layers in a radial direction of the tire;
    the left and right carcass layers of the pair of carcass layers being arranged so as to overlap each other in a tire width direction in the tread region;
    an overlapping width (Wc) of the carcass layers being in a range of 0.5 mm≤Wc≤40 mm;
    a pair of inner liners covering the pair of carcass layers from an inner circumferential surface of the tire; and
    the pair of inner liners being arranged so as to overlap each other in the tire width direction; wherein an end portion of a first inner liner terminates without crossing an end portion of a first carcass layer in the tire width direction, an end portion of a second inner liner extends beyond an end portion of a second carcass layer in the tire width direction, and the first inner liner does not overlap the first carcass layer in the tire width direction; and an overlapping width (Wi) of the pair of inner liners is in a range of 15 mm≤Wi≤35 mm.

2. The pneumatic tire according to claim 1, wherein an overlapping position of the pair of carcass layers, based on a belt width (Wb) of a second widest crossing belt among the plurality of crossing belts, is in a region of ±0.35×Wb centered on a tire equatorial plane.

3. The pneumatic tire according to claim 2, wherein end portions of the carcass layers and end portions of the inner liners are arranged so as to be shifted away from each other in the tire width direction.

4. The pneumatic tire according to claim 3, wherein an overlapping position of the end portions of the left and right carcass layers and an overlapping position of the end portions of left and right inner liners of the pair of inner liners are arranged so as to be shifted away from each other in the tire width direction.

5. The pneumatic tire according to claim 1, wherein the inner liners are adhered to the carcass layers via adhesive tie rubbers.

6. The pneumatic tire according to claim 5, wherein the end portions of the inner liners and end portions of the tie rubbers are arranged to as to be aligned with each other.

7. The pneumatic tire according to claim 5, wherein end portions of the inner liners and end portions of the tie rubbers are arranged so as to be shifted away from each other in the tire width direction.

8. The pneumatic tire according to claim 1, wherein an overlapping position of the pair of carcass layers, based on a belt width (Wb) of a second widest crossing belt among the plurality of crossing belts, is in a region of ±0.35×Wb centered on a tire equatorial plane.

9. The pneumatic tire according to claim 1, wherein end portions of the carcass layers and end portions of the inner liners are arranged so as to be shifted away from each other in the tire width direction.

10. The pneumatic tire according to claim 1, wherein an overlapping position of end portions of the left and right carcass layers and an overlapping position of end portions of left and right inner liners of the pair of inner liners are arranged so as to be shifted away from each other in the tire width direction.

11. The pneumatic tire according to claim 1, wherein the inner liners are adhered to the carcass layers via adhesive tie rubbers, end portions of the inner liners and end portions of the tie rubbers are arranged so as to be shifted away from each other in the tire width direction, and left and right tie rubbers adhere to each other.

12. The pneumatic tire according to claim 11, wherein a first tie rubber on one side does not overlap in the tire width direction with respect to a first inner liner on the other side, and a second tie rubber on the other side overlaps in the tire width direction with respect to a second inner liner on the one side.

13. The pneumatic tire according to claim 1, wherein end portions on an inner side in the tire radial direction of the carcass layers are fixed to fold toward an outer side in the tire width direction so as to wrap around a bead core.

14. A pneumatic tire comprising:
left and right carcass layers forming a pair of carcass layers arranged so as to extend from respective left and right beads of the tire into a tread region;
a plurality of crossing belts arranged on an outside of the pair of carcass layers in a radial direction of the tire;
the left and right carcass layers of the pair of carcass layers being arranged so as to overlap each other in a tire width direction in the tread region;
an overlapping width (Wc) of the carcass layers being in a range of 0.5 mm≤Wc≤40 mm;
a pair of inner liners covering the pair of carcass layers from an inner circumferential surface of the tire; and
the pair of inner liners being arranged so as to overlap each other in the tire width direction; wherein
the inner liners are adhered to the carcass layers via adhesive tie rubbers, end portions of the inner liners and end portions of the tie rubbers are arranged so as to be shifted away from each other in the tire width direction, and left and right tie rubbers adhere to each other; and
a first tie rubber on one side does not overlap in the tire width direction with respect to a first inner liner on the other side, and a second tie rubber on the other side overlaps in the tire width direction with respect to a second inner liner on the one side.

* * * * *